Nov. 12, 1957 V. E. ANDERSON 2,812,867
BOX CAR UNLOADING APPARATUS
Filed Nov. 29, 1954 5 Sheets-Sheet 1
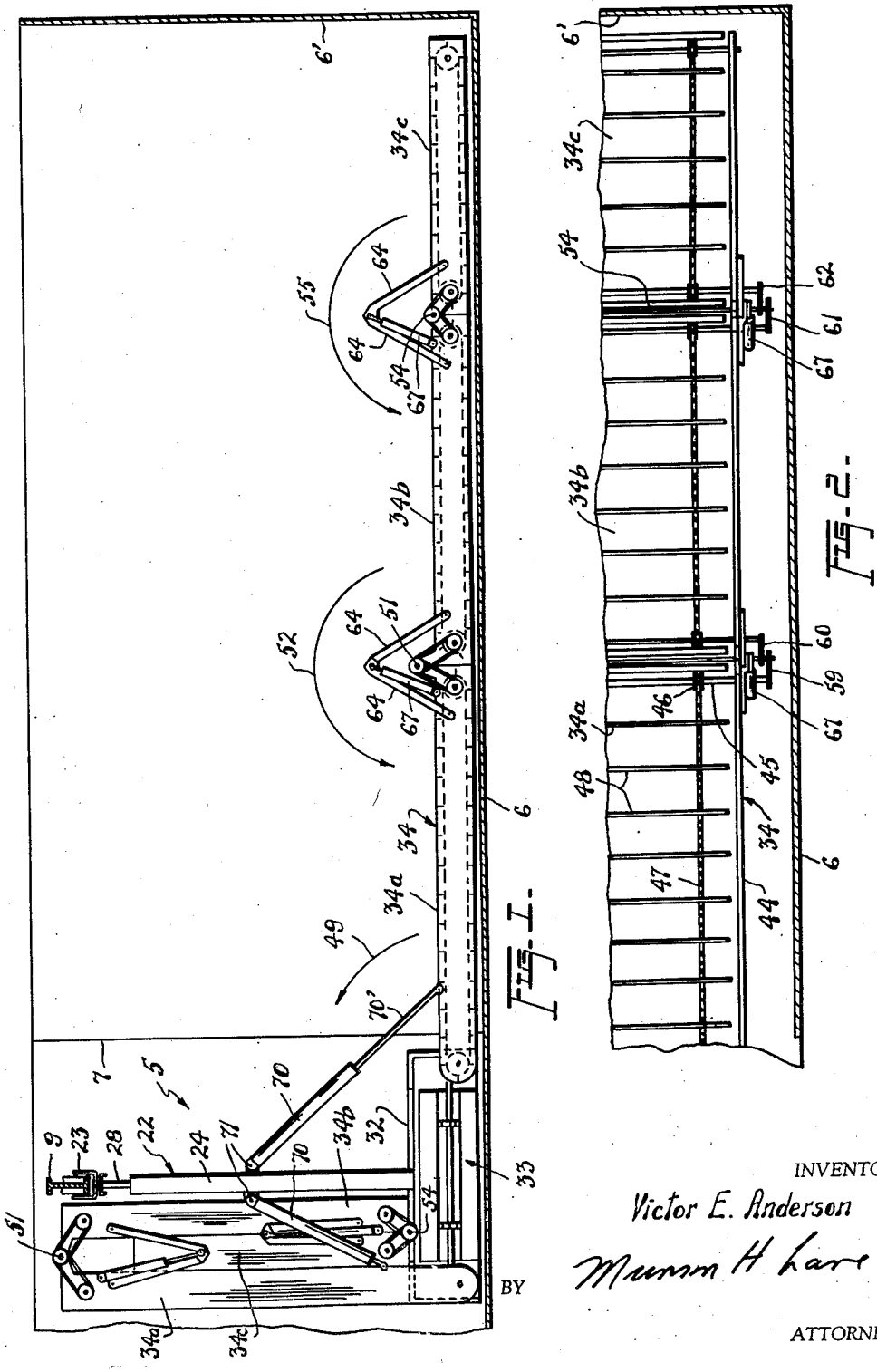
INVENTOR
Victor E. Anderson
BY Munn H Lane
ATTORNEY Nov. 12, 1957  V. E. ANDERSON  2,812,867
BOX CAR UNLOADING APPARATUS
Filed Nov. 29, 1954  5 Sheets-Sheet 2
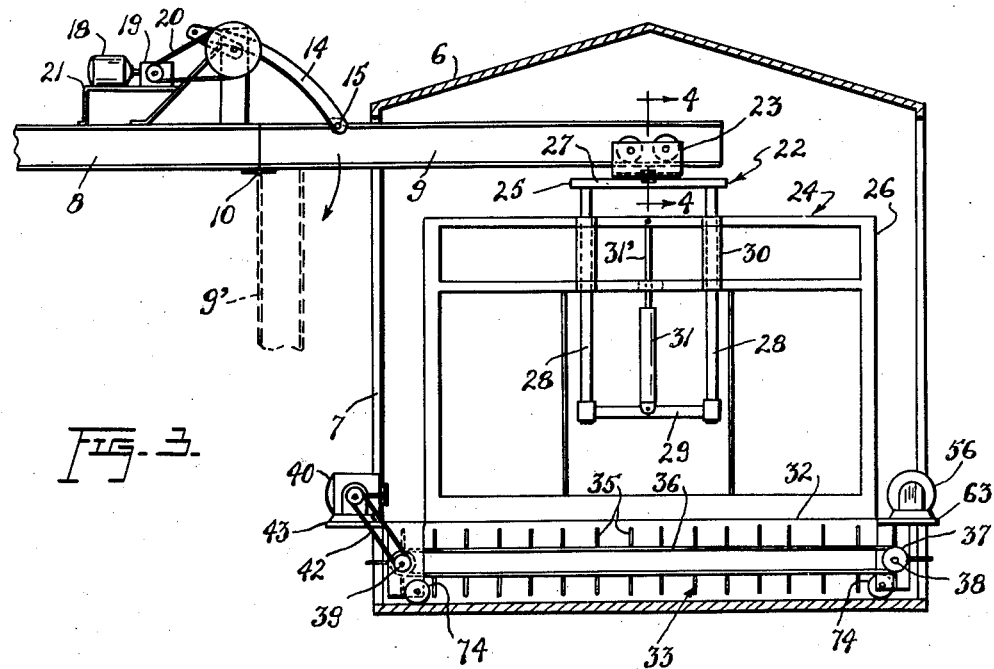
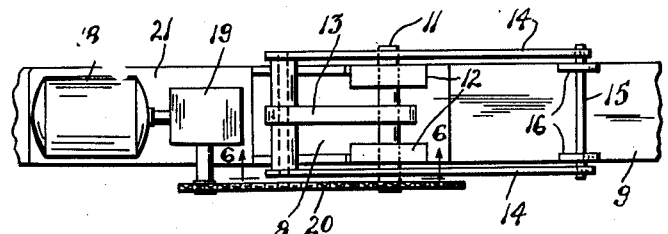
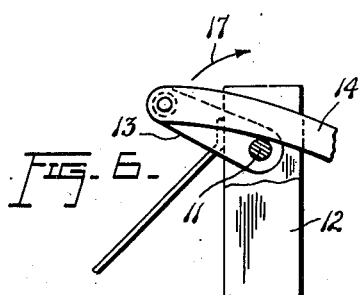
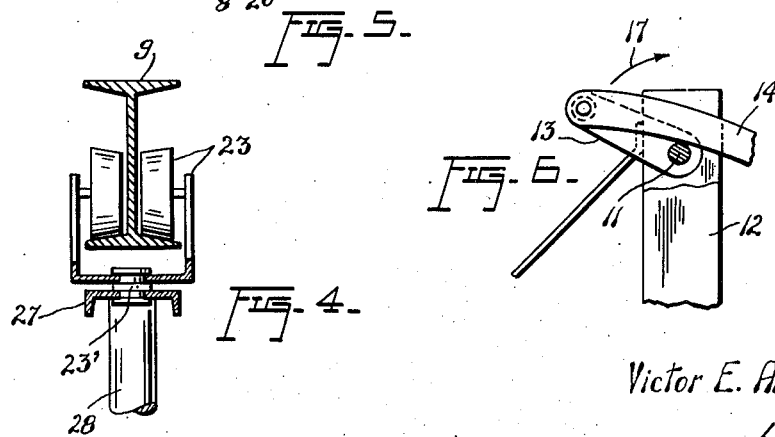
INVENTOR
Victor E. Anderson
BY
ATTORNEY Nov. 12, 1957    V. E. ANDERSON    2,812,867
BOX CAR UNLOADING APPARATUS
Filed Nov. 29, 1954    5 Sheets-Sheet 3

INVENTOR
Victor E. Anderson
BY Munson H. Lane
ATTORNEY

Nov. 12, 1957 V. E. ANDERSON 2,812,867
BOX CAR UNLOADING APPARATUS
Filed Nov. 29, 1954 5 Sheets-Sheet 4
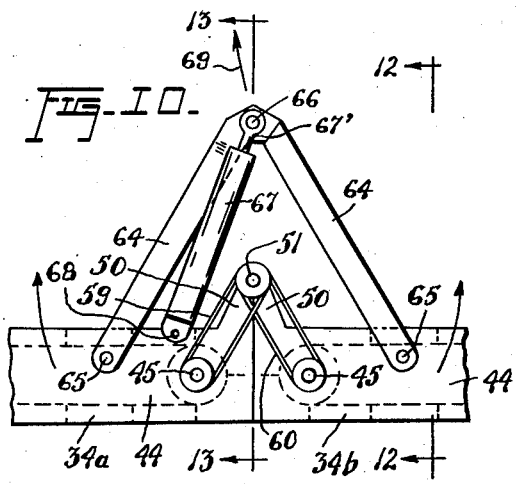
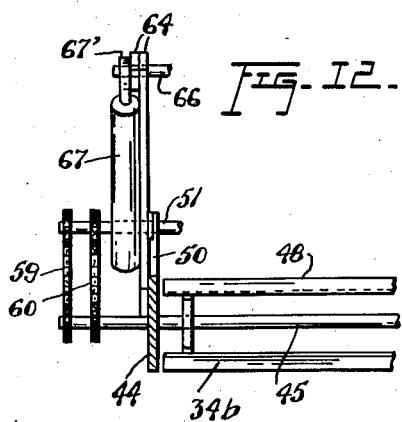
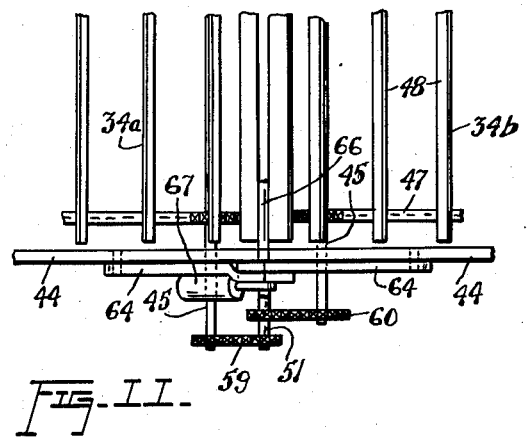
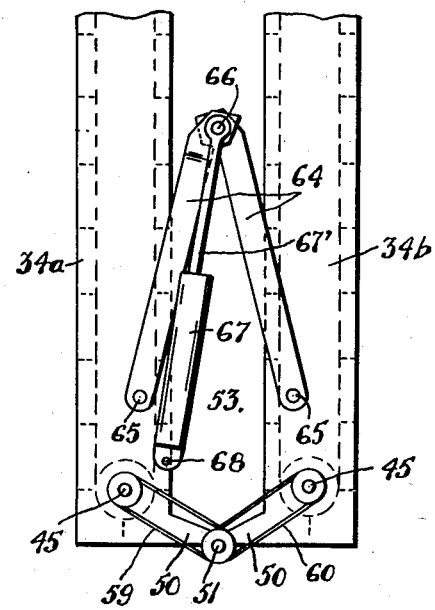
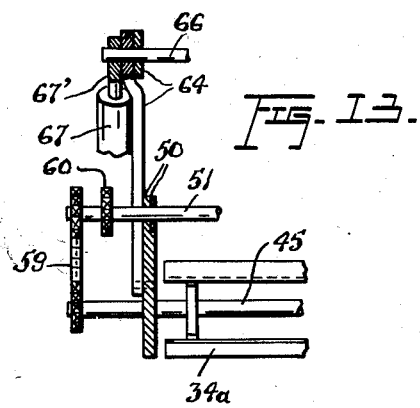
INVENTOR
Victor E. Anderson
BY
ATTORNEY

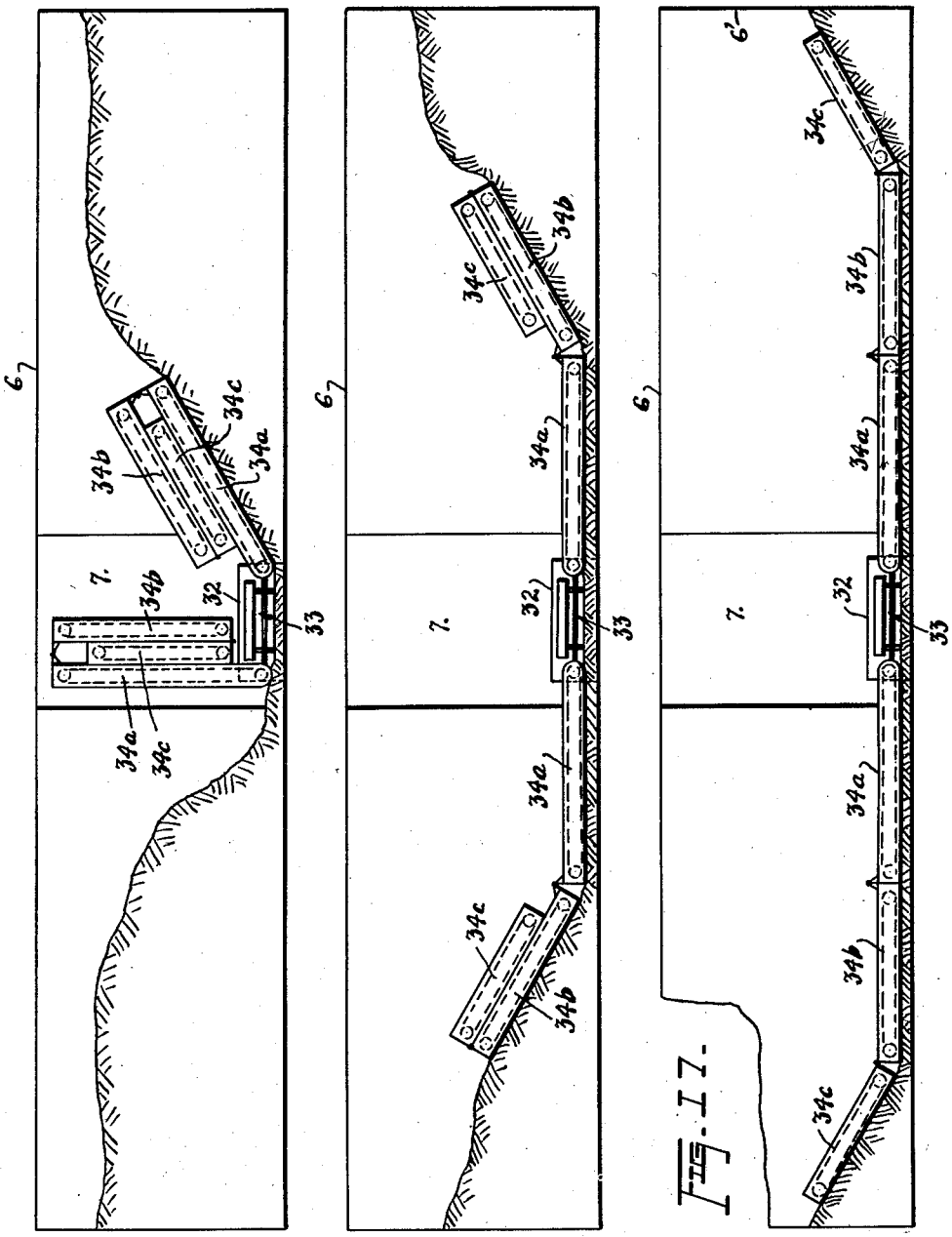

United States Patent Office 2,812,867
Patented Nov. 12, 1957

2,812,867

BOX CAR UNLOADING APPARATUS

Victor E. Anderson, Duluth, Minn.

Application November 29, 1954, Serial No. 471,653

7 Claims. (Cl. 214—44)

This invention relates to new and useful improvement in apparatus for unloading grain or similar bulk material from railroad box cars, and the principal object of the invention is to provide an apparatus of the character herein described whereby the unloading operation may be quickly, easily and efficiently effected with the expenditure of the minimum amount of effort and without the need for manually unloading or cleaning out the side and end portions of the car where conventional apparatus of this type does not readily reach.

Specifically, the invention concerns itself with an unloading apparatus employing a main conveyor for discharging material from a box car through its open door, and a pair of wing conveyors disposed transversely at opposite sides of the main conveyor for delivering material to the latter from opposite end portions of the car; an important feature of the invention residing in the arrangement of the wing conveyors whereby the same may be extended to reach the side and end portions of a car of any conventional length and width.

Another important feature of the invention resides in the provision of novel means for folding sections of the wing conveyors upon one another and upon the main conveyor so that the apparatus, as a whole, may be conveniently inserted in or withdrawn from a box car through its open door.

Another important feature of the invention resides in the provision of a novel support for the conveyor structure, the support including a vertically swingable extension which may be projected into and withdrawn from a box car through its open door, while the conveyor structure is movable, as a whole, on the support and its extension.

Some of the advantages of the invention reside in its simplicity of construction, in its convenient operation, and in its adaptability for use in box cars of conventional types.

The invention will be more readily understood by reference to the accompanying drawing and the following detailed description in which a specific embodiment of the invention is set forth by way of illustration rather than by way of limitation to the details set forth therein.

In the drawings:

Figure 1 is a side elevational view of the apparatus in situ in a box car, one wing conveyor of the apparatus being extended and the other folded;

Figure 2 is a fragmentary top plan view showing the extended wing conveyor of the apparatus;

Figure 3 is a transverse elevational view illustrating the main conveyor of the apparatus and its supporting means, with the wing conveyors omitted for sake of clearness;

Figure 4 is a sectional detail, taken substantially in the plane of the line 4—4 in Figure 3;

Figure 5 is a top plan view, on an enlarged scale, showing the means for raising and lowering the extension of the support for the conveyor frame;

Figure 6 is a sectional detail, taken substantially in the plane of the line 6—6 in Figure 5;

Figure 10 is a fragmentary side elevational view illustrating the adjacent sections of the wing conveyors;

Figure 11 is a top plan view of the subject shown in Figure 10;

Figure 12 is a sectional view, taken substantially in the plane of the line 12—12 in Figure 10;

Figure 13 is a sectional view, taken substantially in the plane of the line 13—13 in Figure 10;

Figure 14 is a fragmentary side elevational view, similar to that shown in Figure 10 but illustrating the conveyor sections in a folded position; and Figures 15, 16 and 17 are diagrammatical views illustrating the apparatus in three different stages of operation.

Figure 7:
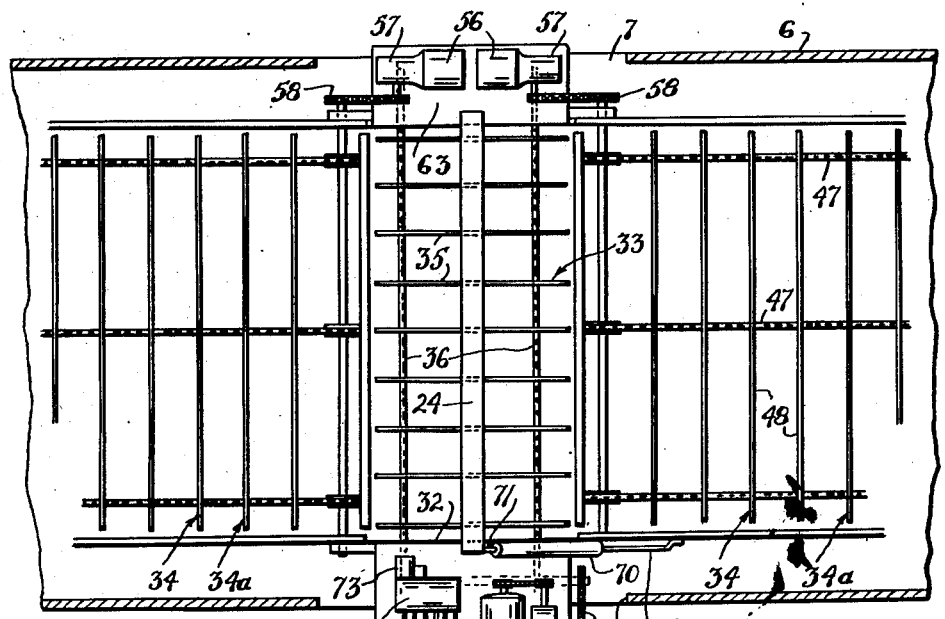
Figure 7 is a fragmentary top plan view of the apparatus in situ in a box car.
Figure 8:
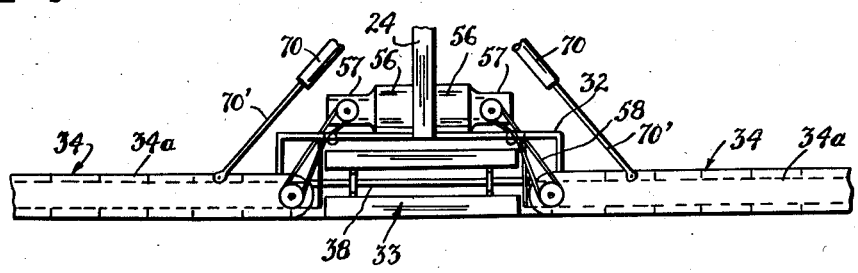
Figure 8 is a fragmentary elevational view of the apparatus, taken from the rear end of the main conveyor.
Figure 9:
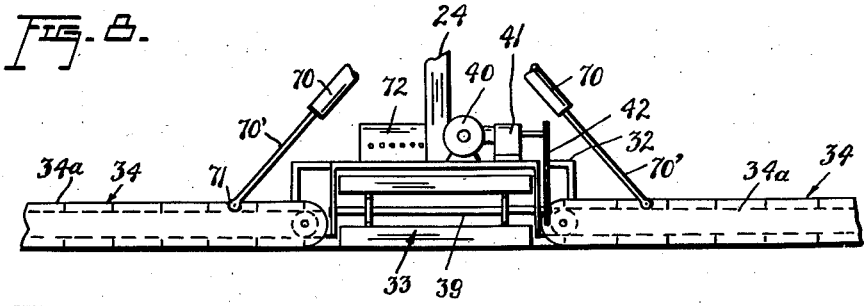
Figure 9 is a fragmentary elevational view of the apparatus, taken from the front end of the main conveyor.

With reference now to the accompanying drawings in detail, the apparatus is designated generally by the numeral 5 and is intended for unloading grain or other similar bulk material from a conventional box car 6 through its open doors 7. The material discharged by the apparatus through the doors 7 of the box car is received, of course, in a suitable hopper, or the like (not shown).

The apparatus 5 embodies in its construction a stationary support 8 which may be in the form of a suitably mounted, horizontally disposed I-beam, and an extension 9 of a similar form is connected to the support 8 by a hinge 10. The extension 9 is normally horizontal so that it constitutes a continuation of the support 8, but may be swung downwardly to an inoperative position indicated at 9' as will be presently explained.

Power actuated means are provided for raising and lowering the extension 9, these means comprising a shaft 11 rotatably mounted in a pair of bearing posts 12 secured to the top flange of the support 8, the shaft 11 having a crank 13 secured thereto which, in turn, is operatively connected by a pair of links 14 to a pin 15 in a pair of brackets 16 on the extension 9. The arrangement of the mechanism is such that when the crank 13 is in the position shown in Figure 6, the links 14 rest on top of the shaft 11 and thereby lock the extension 9 in its horizontal position. However, when the shaft 11 is rotated in the direction of the arrow 17, the links 14 permit the extension 9 to be lowered to its inoperative position 9'. Rotation of the shaft 11 is effected by an electric motor 18 coupled to a reduction gear box 19 and driving the shaft 11 through the medium of a chain drive 20. The motor 18 as well as the gear box 19 are mounted upon a suitable platform 21.

As is best shown in Figure 3, the extension 9 is projectable into a box car 6 through one of its open doors 7 and a conveyor supporting frame, designated generally by the numeral 22 is movably suspended from the support 8 and the extension 9, as will now be described. The frame 22 comprises a carriage or trolley 23 which is adapted for traversing movement on the support 8 and extension 9 and is provided at the underside thereof with a vertical pivot element or pin 23' (Fig. 4). A framework 24 is suspended from the pin 23' for swinging movement in a horizontal plane, the framework 24 consisting of an upper portion 25 and a vertically movable lower portion 26. The upper framework portion 25 comprises a cross member 27 suspended from the aforementioned pin 23' at the center thereof and equipped at its ends with a pair of depending rods 28 which, in turn, are connected together at their lower ends by a cross bar 29. The framework portion 26 is provided with a pair of vertical sleeves or guides 30 having the rods 28 slidable therein, whereby the framework portion 26 may be raised or lowered with respect to the relatively stationary portion 25.

The raising and lowering of the framework portion 26 is effected by a hydraulic cylinder 31 connected to the cross bar 29 and having its piston rod 31' connected to the framework portion 26, as shown.

The framework portion 26 is provided at the bottom thereof with a box-shaped frame unit 32 which affords supporting means for a main conveyor 33 and a pair of wing conveyors 34. As will become apparent, the main conveyor 33 is adapted to be projected into the box car 6 through one of the open doors 7 for discharging material therefrom, while the wing conveyors 34 are disposed transversely at opposite sides of the main conveyor and are adapted to deliver material to the latter from opposite end portions of the car.

Both the main conveyor 33 and the wing conveyors 34 are of the drag type, endless chain and cross slat construction, in accordance with conventional practice. Thus, the cross slats 35 of the main conveyor 33 are carried by endless chains 36 passing around sprockets 37 secured to a pair of shafts 38, 39, these shafts being rotatably mounted in opposite end portions of the frame unit 32.

The main conveyor 33 is driven by an electric motor 40 coupled to a reduction gear box 41 which, in turn, is operatively connected by a chain drive 42 to the aforementioned shaft 39. Both the motor 40 and the gear box 41 are mounted upon a suitable platform 43 provided on the frame unit 32.

Each of the wing conveyors 34 is of an articulated construction, consisting of a plurality of hingedly connected sections, namely, an inner section 34a, an intermediate section 34b and an outer section 34c. Each of these sections consists of a pair of side members 44 having a pair of transverse shafts 45 journalled therein, the shafts 45 being provided with sprockets 46 equipped with endless chains 47 which, in turn, carry the cross slats 48.

The inner ends of the inner sections 34a are hingedly connected to the frame unit 32 coaxially with the shafts 45, whereby the sections 34a may be swung in a vertical plane as indicated by the arrow 49. The hinged connection between the sections 34a and 34b is best shown in Figures 10–14 inclusive, wherein it will be noted that the adjacent ends of these sections are provided with upwardly projecting, aligned ears 50 having a hinge pin or shaft 51 extending therethrough. Thus, the shaft 51 is disposed above or offset from the sections 34a and 34b, so that when the section 34b is folded upon the section 34a as indicated by the arrow 52, a space 53 will exist between the two sections.

A similar hinged connection is provided between the sections 34b and 34c, with the exception that the hinge pin or shaft 54 herein is disposed substantially in the plane of the upper edges of the two sections. Accordingly, when the sections 34b and 34c are folded as indicated by the arrow 55, they are disposed in an abutting or contacting relation on each other.

The section 34c is shorter than the section 34b and the latter, in turn, is shorter than the section 34a. The combined length of the three sections is such that they reach from the main conveyor 33 to the end wall 6' of the box car. Moreover, when the wing conveyor sections are folded, the section 34c is first folded upon the section 34b as shown by the arrow 55, whereupon the two folded sections 34b and 34c are folded as shown by the arrow 52 upon the section 34a with the result that the section 34c is accommodated in the aforementioned space 53 between the sections 34a and 34b. The folded position of the sections is best illustrated in the left hand portion of Figure 1. It is to be noted that in this position the folded sections are compactly stored vertically above the frame unit 32, the two wing conveyors being disposed at the respective opposite sides of the framework 24, so that the entire assembly can be readily projected into or withdrawn from the box car through one of its open doors.

The sections 34a of the two wing conveyors are driven by a pair of electric motors 56 coupled to reduction gear boxes 57 which, in turn, are operatively connected to the shafts 45 at the inner ends of the sections 34a by chain drives 58. The sections 34b of the two wing conveyors are driven from the sections 34a by chain drives 59, 60 operating to and from the aforementioned hinge pin or shaft 51, whereby the drive connection between the sections is maintained regardless of the relative positions of the sections in their hinged connection. Similarly, the sections 34c of the conveyors are driven from the sections 34b by chain drives 61, 62 operating to and from the aforementioned hinge pin or shaft 54. The motors 56 and gear boxes 57 are mounted upon a suitable platform 63 on the rear end portion of the frame unit 32.

Power means are provided for folding the sections of the wing conveyors 34, these means comprising pairs of links 64 which are pivoted at 65 to the adjacent end portions of the sections and are pivotally connected together at their upper, convergent ends by a shaft or pin 66. A hydraulic cylinder 67 is provided in conjunction with each pair of the links 64, the cylinder 67 being pivotally connected as at 68 to one of the conveyor sections while the piston rod 67' of the cylinder is connected to the shaft or pin 66. It will be observed from the foregoing that when the cylinder 67 is actuated so as to push the rod 67' outwardly in the direction of the arrow 69 in Figure 10, the links 64 will cause the conveyor sections to fold about the hinge pin or shaft 51 until they assume the folded position shown in Figure 14. It is to be understood that although Figures 10–14 illustrate the cylinder 67 and links 64 in conjunction with the sections 34a and 34b, a similar arrangement also applies to the sections 34b and 34c.

By virtue of the links 64 and cylinders 67, the means for folding and unfolding the conveyor sections are disposed directly adjacent the hinged connection between the various sections and are thus able to efficiently adjust their relative positions and hold them in proper adjustment. It is to be also noted that although the cylinders 67, the links 64 and the chain drives 59—62 are located at the outside of the side members 44 of the conveyor sections, these parts are preferably of such size that the conveyor sections are as wide as possible, and therefore, able to engage and gather material from the full width of the box car. This is further facilitated by the pivotal attachment of the framework 24 to the carriage 23 by the pin 23', which permits the framework to be swung in a horizontal plane, thus shifting the wing conveyors 34 from side to side in the box car.

Power means are provided for shifting the folded sections of the wing conveyors 34 to their stored position above the frame unit 32, these means consisting of hydraulic cylinders 70 which are pivoted as at 71 to the framework portion 26 and have piston rods 70' pivotally connected to the conveyor sections 34a, as shown. Thus, when the cylinders 70 are actuated so as to draw the rods 70' inwardly therein, the conveyor sections 34a together with the sections 34b and 34c folded thereon, will be shifted to their storage positions above the frame unit 32, as illustrated in the left hand portion of Figure 1.

The various hydraulic cylinders 31, 67 and 70 receive fluid under pressure from a suitable distributing and control valve 72 mounted upon the platform 43 and operatively connected to a motor-driven pump 73. Finally, it is to be noted that the frame unit 32 is provided with a plurality of wheels 74 to engage the floor of the box car when the framework portion 26 is lowered.

Having thus described the construction of the apparatus, the operation thereof will now be explained.

When the apparatus is not in use, the carriage 23 is carried by the support 8 and the entire conveyor assembly is disposed in its stored or folded position on the framework 22 under the support 8, while the extension 9 of the support 8 is in its lowered position 9'.

When it is desired to place the apparatus in operation, the motor 18 is first energized so as to raise the extension 9 to its horizontal position and, at the same time, project it into a box car through an open door of the latter. The carriage 23 is then propelled along the support 8 and extension 9 until the framework 22 is disposed within the box car and the cylinder 31 may then be energized so as to lower the framework portion 26 until the wheels 74 rest on the box car floor.

Thereupon the cylinders 70 may be actuated to permit the folded wing conveyors 34 to shift laterally as illustrated in Figure 15 and, upon energization of the motors 40 and 56, the main conveyor 33 as well as the wing conveyors 34 will become motivated. In so doing, the wing conveyor sections 34a will deliver material to the main conveyor 33 and the latter, in turn, will discharge such material through the open door of the box car into a hopper, or some other suitable receptacle.

As the action of the wing conveyor sections 34a continues they will be progressively lowered with the dropping level of the material thereunder and, as shown in Figure 16, the cylinders 67 between the conveyor sections 34a and 34b may then be energized so as to unfold the sections 34b and 34c. Ultimately, the cylinders 67 between the sections 34b and 34c may be energized so as to unfold the outer sections 34c and permit the wing conveyors to extend to the opposite end walls of the box car, as will be clearly apparent from Figure 17. Of course, the apparatus may be folded and withdrawn from the box car by simply reversing the procedure above described.

Although in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. In a box car unloading apparatus, the combination of a support including an extension projectable through an open box car door and retractable to an inoperative position at the side of a box car, a frame including a carriage movable on said support and on said extension and a framework suspended from said carriage, a main conveyor supported by said framework for discharging material from a box car through its open door, a pair of wing conveyors disposed transversely at opposite sides of said main conveyor and adapted to deliver material thereto from opposite end portions of a box car, each of said wing conveyors comprising a plurality of hingedly connected sections foldable into superposed relation, means for driving the main conveyor and the wing conveyors, means provided at and cooperating with the hinged connection between adjacent sections of the wing conveyors for folding and unfolding the same, and means extending from said framework to said wing conveyors for shifting the folded sections of the latter into a vertical position on the framework.

2. In a box car unloading apparatus, the combination of a support including an extension projectable through an open box car door and retractable to an inoperative position at the side of a box car, a frame including a carriage movable on said support and on said extension, a vertical pivot element provided on said carriage, and a framework suspended from said pivot element for rotation in a horizontal plane, a main conveyor supported by said framework for discharging material from a box car through its open door, a pair of wing conveyors disposed transversely at opposite sides of said main conveyor and adapted to deliver material thereto from opposite end portions of a box car, each of said wing conveyors comprising a plurality of hingedly connected sections foldable into superposed relation, means for driving the main conveyor and the wing conveyors, means provided at and cooperating with the hinged connection between adjacent sections of the wing conveyors for folding and unfolding the same, and means extending from said framework to said wing conveyors for shifting the folded sections of the latter into a vertical position on the framework.

3. In a box car unloading apparatus, the combination of a support including an extension projectable through an open box car door and retractable to an inoperative position at the side of a box car, a frame including a carriage movable on said support and on said extension and a framework suspended from said carriage, said framework including an upper portion connected to the carriage and a vertically movable lower portion connected to the upper portion, a main conveyor supported by the lower portion of said framework for discharging material from a box car through its open door, a pair of wing conveyors disposed transversely at opposite sides of said main conveyor and adapted to deliver material thereto from opposite end portions of a box car, each of said wing conveyors comprising a plurality of hingedly connected sections foldable into superposed relation, means for driving the main conveyor and the wing conveyors, means provided at and cooperating with the hinged connection between adjacent sections of the wing conveyors for folding and unfolding the same, and means extending from said framework to said wing conveyors for shifting the folded sections of the latter into a vertical position on the framework.

4. In a box car unloading apparatus, the combination of a framework projectable through an open box car door, a main conveyor supported by said framework for discharging material from a box car through its open door, a pair of wing conveyors disposed transversely at opposite sides of said main conveyor and adapted to deliver material thereto from opposite end portions of a box car, each of said wing conveyors comprising a plurality of sections, cross shafts pivotally connecting adjacent sections of said wing conveyors together whereby said sections may be folded into superposed relation, pairs of links pivoted to the adjacent sections at opposite sides of the cross shaft connecting the same, pivot means connecting free ends of the links in each pair together, hydraulic cylinders extending from said pivot means to one of the sections in each adjacent pair whereby the sections may be folded and unfolded, means for driving the main conveyor and said wing conveyors, inner end sections of said wing conveyors being pivoted to opposite sides of said framework for swinging in a vertical plane, and hydraulic cylinders extending diagonally from said framework to the inner end sections of said wing conveyors for shifting the folded sections of the latter into a vertical position on the framework.

5. The combination as set forth in claim 3 together with means for raising and lowering the vertically movable lower portion of said framework.

6. The combination as set forth in claim 3 wherein said extension is hinged to said support for movement in a vertical plane, a rotatable crank provided on said support, a crank arm extending from said crank to said extension, and power-actuated means provided on said support for rotating said crank whereby said extension may be lowered and raised.

7. In a box car unloading apparatus, the combination of a framework projectable through an open box car door, a main conveyor supported by said framework for discharging material from a box car through its open door, a pair of wing conveyors disposed transversely at opposite sides of said main conveyor and adapted to deliver material thereto from opposite end portions of a box car, each of said wing conveyors comprising a plurality of sections, cross shafts pivotally connecting adjacent sections of said wing conveyors together whereby said sections may be folded into superposed relation, pairs of links pivoted to the adjacent sections at opposite sides of the cross shaft connecting the same, pivot means connecting free ends of the links in each pair together, hydraulic cylinders extending from said pivot means to one of the sections in each adjacent pair whereby the sections may be folded and unfolded, means for driving the main conveyor and said wing conveyors, inner end sections of said wing conveyors being pivoted to opposite sides of said framework for swinging in a vertical plane, and means extending from said framework to the inner end sections of said wing conveyors for shifting the folded sections of the latter into a vertical position on the framework.

References Cited in the file of this patent

UNITED STATES PATENTS

| | | |
|---|---|---|
| 373,610 | Sanders | Nov. 22, 1887 |
| 1,015,939 | Brunelle | Jan. 30, 1912 |
| 2,219,926 | Jensen | Oct. 29, 1940 |
| 2,521,861 | Mathias | Sept. 12, 1950 |
| 2,598,517 | Drott | May 27, 1952 |